United States Patent
Boehm et al.

[11] Patent Number: 5,919,100
[45] Date of Patent: *Jul. 6, 1999

[54] FLUID OR LIQUID FILLED NON-WOUND GOLF BALL

[75] Inventors: Herbert C. Boehm, Norwell, Mass.; William E. Morgan, Barrington, R.I.; Walter L. Reid, Mattapoisett, Mass.; Samuel A. Pasqua, Jr., Bristol, R.I.; Christopher Cavallaro, Attleboro; Kevin M. Harris, New Bedford, both of Mass.

[73] Assignee: Acushnet Company, Fairhaven, Mass.

[*] Notice: This patent is subject to a terminal disclaimer.

[21] Appl. No.: 08/962,577

[22] Filed: Nov. 3, 1997

Related U.S. Application Data

[63] Continuation-in-part of application No. 08/615,346, Mar. 11, 1996, Pat. No. 5,683,312.

[51] Int. Cl.⁶ .................................................. A63B 37/08
[52] U.S. Cl. ........................... 473/354; 473/376; 473/378; 473/384; 273/DIG. 20
[58] Field of Search ..................... 473/354, 376, 473/377, 378, 384, 374

[56] References Cited

U.S. PATENT DOCUMENTS

| | | | |
|---|---|---|---|
| 878,070 | 2/1908 | Kingzett | 473/354 |
| 1,298,410 | 3/1919 | Schupphaus | 473/354 |
| 1,530,820 | 3/1925 | Evans et al. | 473/354 |
| 1,568,513 | 1/1926 | Lewis . | |
| 1,568,514 | 1/1926 | Lewis | 473/354 |
| 1,622,601 | 3/1927 | Miller . | |
| 1,904,012 | 4/1933 | Reichard . | |
| 4,431,193 | 2/1984 | Nesbitt | 273/235 |
| 4,564,199 | 1/1986 | Adams | 473/354 |
| 5,150,906 | 9/1992 | Molitor et al. | 273/220 |
| 5,314,187 | 5/1994 | Proudfit | 273/235 |
| 5,439,227 | 8/1995 | Egashira et al. | 473/377 |
| 5,467,994 | 11/1995 | Moriyama et al. | 273/222 |
| 5,480,155 | 1/1996 | Molitor et al. | 473/354 |
| 5,683,312 | 11/1997 | Boehm et al. | 473/376 X |

*Primary Examiner*—George J. Marlo
*Attorney, Agent, or Firm*—Pennie & Edmonds LLP

[57] ABSTRACT

A golf ball having a diameter and comprising a fluid mass at the center of the ball, a first, solid, non-wound layer surrounding the fluid mass comprised of a non-elastic polymer material selected from the group of thermoplastic material, metal, and plastic, and having an inner diameter in the range of 30 to 70% of the ball diameter; a second, solid, non-wound layer surrounding the first mantle layer comprising an elastomeric polymer material selected from the group of thermoset rubber material and thermoplastic elastomeric material having an outer diameter in the range of 80 to 98% of the ball diameter, a hardness of less than about 65 Shore D, and a compression of about 80 or greater; and a cover surrounding the second layer.

25 Claims, 10 Drawing Sheets

FLUID OR LIQUID FILLED NON-WOUND GOLF BALL

CROSS-REFERENCE TO RELATED APPLICATION

This is a continuation-in-part application of application Ser. No. 08/615,346, now U.S. Pat. No. 5,683,312, filed on Mar. 11, 1996.

FIELD OF THE INVENTION

The present invention is directed to a golf ball and, more particularly, a golf ball comprised of a fluid or liquid center, a first layer surrounding the center, a second, solid, non-wound layer and a cover.

BACKGROUND OF THE INVENTION

Generally, golf balls have been classified as two piece balls or three piece balls. Two piece balls are comprised of a solid polymeric core and a cover. These balls are generally easy to manufacture, but are regarded as having limited playing characteristics. Three piece balls are comprised of a solid or liquid filled center surrounded by tensioned elastomeric material and a cover. Three piece balls generally have a good "click" and "feel" when struck by a golf club, but are more difficult to manufacture than two piece balls.

The prior art is comprised of various golf balls that have been designed to provide optimal playing characteristics. These characteristics are generally the initial velocity and spin of the golf ball, which can be optimized for various players. For instance, certain players prefer to play a ball that has a high spin rate for playability. Other players prefer to play a ball that has a low spin rate to maximize distance. However, these balls tend to be hard feeling and difficult to control around the greens.

The prior art is comprised of liquid filled golf balls. Wound golf balls have been made with liquid centers for many years. Both U.S. Pat. Nos. 1,568,513 and 1,904,012 are directed to wound golf balls with liquid filled centers. U.S. Pat. Nos. 5,150,906 and 5,480,155, are directed to a hollow spherical shell of a polymeric material which is filled with a liquid or unitary, non-cellular material that is a liquid when introduced into the shell. The shell is disclosed as being the outer cover or an inner layer with the outer cover formed to the external surface thereof. The shell varies in thickness from about 0.060 to 0.410 inches in thickness.

The Rules of Golf as approved by the United States Golf Association (USGA), include the following rules that relate to golf ball construction:

a. Weight

The weight of the ball shall not be greater than 1.620 ounces avoirdupois (45.92 gm).

b. Size

The diameter of the ball shall be not less than 1.680 inches (42.67 mm). This specification will be satisfied if, under its own weight, a ball falls through a 1.680 inches diameter ring gauge in fewer than 25 out of 100 randomly selected positions, the test being carried out at a temperature of 23+/−1° C.

c. Spherical Symmetry

The ball must not be designed, manufactured or intentionally modified to have properties which differ from those of a spherically symmetrical ball.

d. Initial Velocity

The velocity of the ball shall not be greater than 250 feet (76.2 m) per second when measured on apparatus approved by the United States Golf Association. A maximum tolerance of 2% will be allowed. The temperature of the ball when tested will be 23+/−1° C.

e. Overall Distance Standard (ODS)

A brand of golf ball, when tested on apparatus approved by the USGA on the outdoor range at the USGA Headquarters under the conditions set forth in the Overall Distance Standard for golf balls on file with the USGA, shall not cover an average distance in carry and roll exceeding 280 yards (256 m) plus a tolerance of 6%.

The flight of a golf ball is determined by many factors, but only three factors that are typically controlled by the golfer. By impacting the ball with a golf club, the golfer typically controls the speed of the golf ball, the launch angle and the spin rate. The launch angle sets the initial trajectory of the golf ball's flight. The speed and spin of the ball give the ball lift which will define the ball's overall flight path along with the weight and drag of the golf ball. Where the ball stops after being struck by a golf club also depends greatly on the weather and the landing surface the ball contacts.

Many golfers have what is termed a "low swing speed." This means that the club head speed at impact is relatively slow when compared to a professional golfer's. Typically, when driving a golf ball the average professional golf ball speed is approximately 234 ft/s (160 mph). A person having a low swing speed typically drives the ball at a speed less than 176 ft/s (120 mph). Upwards of thirty percent of all golfers today have swing speeds that produce drives of less than 210 yards. A person with a low swing speed has a low ball speed. His or her ball does not fly very far because of the lack of speed and lift.

SUMMARY OF THE INVENTION

Broadly, the present invention comprises a golf ball having a core and a cover in which the core is comprised of a fluid or liquid mass center surrounded by a non-wound portion. The non-wound portion is comprised of a first layer surrounding the center and a second, solid, non-wound layer. The solid, non-wound portion is preferably comprised of thermoset rubber, plastic or thermoplastic materials. The non-wound portion of the core, preferably, has an inner diameter in a range of about 30 to 70% of the finished ball diameter and an outer diameter of about 80 to 98% of the finished ball diameter.

Still further, for a preferred golf ball having an outer diameter of approximately 1.68 inches, the first layer preferably has an inner diameter of approximately 0.9 to 0.95 inch. The second layer preferably has an inner diameter in the range of 0.8 to 1.3 inches. Yet further still, the second layer preferably has an outside diameter in the range of 1.45 to 1.62 inches. In the most preferred embodiment, the second layer has a radial thickness of about 0.2 to 0.3 inch.

Still further, the invention is preferably a golf ball comprised of a fluid or liquid mass at the center; a first layer comprised of either an elastomeric or non-elastomeric thermoplastic, or a plastic material; a second layer comprised of a thermoset rubber material, such as polyisoprene, styrene butadiene or polybutadiene, or combinations thereof or thermoplastic materials such as copolymers of methyl-methacrylate with butadiene and styrene, copolymers of methyl-acrylate with butadiene and styrene, acrylonitrile styrene copolymers, polyether-ester, polyether-amide, polyurethane and/or blends thereof; and a cover.

More particularly, the invention is directed to a golf ball having a fluid or liquid mass at the center of the ball having a specific gravity and viscosity such that the performing properties of the ball, such as the moment of inertia, ball weight, core compression may be varied to achieve certain desired parameters such as spin rate, spin decay, initial velocity, etc. Still further the fluid mass at the center preferably has a high specific gravity and/or is pressurized to an internal pressure of greater than 25 psi for a high spin ball. More preferably, the core has a compression of greater than 80 and the cover has a shore D hardness less than 65 for the high spin ball.

For a low spin ball, the fluid mass at the center and the non-wound core layers are configured such that the core has a compression of less than 80. Still further, the cover should have a Shore D hardness of about 65 or greater. Still more particularly, the invention is directed to a golf ball having a high viscosity liquid mass at the ball center for a low spin rate ball or a low viscosity gas or liquid for a high spin rate ball. By providing two non-wound, core layers for surrounding the fluid mass at the center, the properties thereof, such as specific gravity, resiliency and compression can be varied to make balls having the desired characteristics.

In an embodiment for low swing speed players, the fluid mass at the center has a low specific gravity such that the ball weight is less than about 1.56 ounces. More preferably, the ball has a weight of about 1.54 ounces to about 1.56 ounces.

DESCRIPTION OF THE PREFERRED EMBODIMENT

Figure 1:
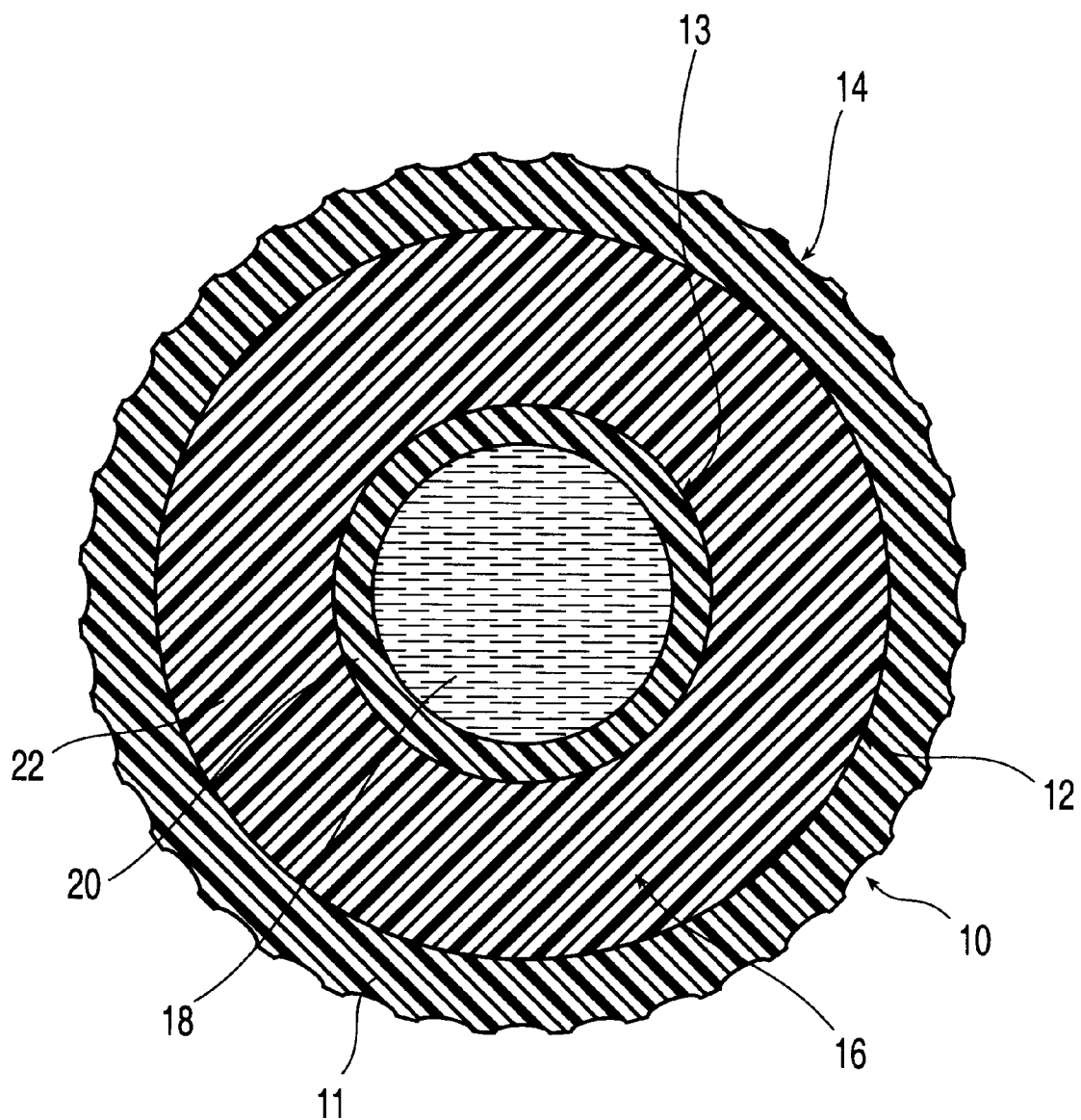
FIG. 1 is a sectional view of a ball of the present invention.

Referring to FIG. 1, ball 10 includes a cover 11 and a core 12. The core 12 in turn includes a fluid or liquid mass at the center 18 and a non-wound, core portion 16, which is comprised of a first, inner portion 20 and a second, outer portion 22.

The cover 11 provides the interface between the ball 10 and a club and other objects such as trees, cart paths and grass. Properties that are desirable for the cover are good flowability, high abrasion resistance, high tear strength, high resilience, and good mold release, among others.

On the outer surface of the cover are a plurality of dimples 14. Preferably, the dimples are arranged as set forth in U.S. Pat. Nos. 4,858,923 and 4,804,189, which are incorporated herein by reference. Moreover, preferably, the dimples cover at least about 70% of the outer surface of the ball 10. In the most preferred embodiment, the dimples have a plurality of dimple diameters and are arranged to cover more than 75% of the outer surface of the ball 10. Still further, there are between 300 and 500 dimples with an average diameter of between 0.1 and 0.17 and, most preferably, between 0.13 and 0.16 inches.

The cover 11 can be comprised of polymeric materials such as ionic copolymers of ethylene and an unsaturated monocarboxylic acid which are available under the trademark "SURLYN" of E.I. DuPont De Nemours & Company of Wilmington, Del. or "IOTEK" or "ESCOR" from Exxon. These are copolymers of ethylene and methacrylic acid or acrylic acid partially neutralized with zinc, sodium, lithium, magnesium, potassium, calcium, manganese, nickel or the like.

In accordance with the various embodiments of the present invention, the cover 11 is of a thickness to generally provide sufficient strength, good performance characteristics and durability. Preferably, the cover 11 is of a thickness from about 0.03 inches to about 0.12 inches. More preferably, the cover 11 is about 0.04 to 0.09 inches in thickness and, most preferably, is about 0.05 to 0.085 inches in thickness.

In accordance with a preferred embodiment of this invention, the cover in question can be formed from mixtures or blends of zinc and/or lithium and sodium ionic copolymers.

Surlyn resins are ionic copolymers in which sodium, lithium or zinc salts are the reaction product of an olefin having from 2 to 8 carbon atoms and an unsaturated monocarboxylic acid having 3 to 8 carbon atoms. The carboxylic acid groups of the copolymer may be totally or partially neutralized and might include methacrylic, crotonic, maleic, fumaric or itaconic acid.

The cover and core materials of this invention can likewise be used in conjunction with homopolymeric and copolymer materials such as:

(1) Vinyl resins such as those formed by the polymerization of vinyl chloride, or by the copolymerization of vinyl chloride with vinyl acetate, acrylic esters or vinylidene chloride.

(2) Polyolefins such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using single-site catalyst.

(3) Polyurethanes including those prepared from polyols and diisocyanates or polyisocyanates and those disclosed in U.S. Pat. No. 5,334,673.

(4) Polyureas such as those disclosed in U.S. Pat. No. 5,484,870.

(5) Cationic and anionic polyurethane and polyurea ionomers, including:
  (a) thermoplastic and thermoset cationic polyurethane and polyurea ionomers containing cationic moieties such as quaternized nitrogen groups associated with halide or acetate anion either on the pendant or polymer backbone of polyurethane or polyurea, or
  (b) thermoplastic and thermoset anionic polyurethane and polyurea ionomers containing anionic moieties such as carboxylate or sulfonate or phosphonate neutralized with counter cations either on the pendant or polymer backbone of polyurethane or polyurea.

(6) Non-elastic thermoplastics like polyesters and polyamides such as poly(hexamethylene adipamide) and others prepared from diamines and dibasic acids, as well as those from amino acids such as poly (caprolactam). Still further, non-elastic thermoplastics can include polyethylene terephthalate, polybutylene terephthalate, polyethylene terephthalate/glycol (PETG), polyphenylene oxide resins, and blends of non-elastic thermoplastics with Surlyn, polyethylene, ethylene copolymers, ethylene-propylene diene terpolymer, etc.

(7) Acrylic resins and blends of these resins with poly vinyl chloride, elastomers, etc.

(8) Thermoplastic rubbers such as olefinic thermoplastic rubbers including blends of polyolefins with ethylene-propylene diene terpolymer.

(9) Thermoplastic elastomers including block copolymers of styrene and butadiene, or isoprene or ethylene-butylene rubber, copoly(ether-amides) such as "Pebax" sold by Elf Atochem, copoly(ether-ester) block copolymer elastomers sold under the trademarks "Hytrel" by E.I. DuPont De Nemours & company of Wilmington, Del. and "Lomod" by General Electric Company, Pittsfield, Mass.

(10) Blends and alloys, including polycarbonate with acrylonitrile butadiene styrene, polybutylene terephthalate, polyethylene terephthalate, styrene maleic anhydride, polyethylene, elastomers, etc. Blends such as polyvinyl chloride with acrylonitrile butadiene styrene or ethylene vinyl acetate or other elastomers. Blends of thermoplastic rubbers with polyethylene, polypropylene, polyacetal, polyamides, polyesters, cellulose esters, etc.

(11) Saponified polymers and blends thereof, including: saponified polymers obtained by reacting copolymers or terpolymers having a first monomeric component having olefinic monomer from 2 to 8 carbon atoms, a second monomeric component comprising an unsaturated carboxylic acid based acrylate class ester having from 4 to 22 carbon atoms, and an optional third monomeric component comprising at least one monomer selected from the group consisting of carbon monoxide, sulfur dioxide, an anhydride, a glycidyl group and a vinyl ester with sufficient amount of an inorganic metal base. These saponified polymers can be blended with ionic and non-ionic thermoplastic and thermoplastic elastomeric materials to obtain a desirable property.

(12) Copolymer and terpolymers containing glycidyl alkyl acrylate and maleic anhydride groups, including: copolymers and terpolymers containing glycidyl alkyl acrylate and maleic anhydride groups with a first monomeric component having olefinic monomer from 2 to 8 carbon atoms, a second monomeric component comprising an unsaturated carboxylic acid based acrylate class ester having from 4 to 22 carbon atoms, and an optional third monomeric component comprising at least one monomer selected from the group consisting of carbon monoxide, sulfur dioxide, an anhydride, a glycidyl group and a vinyl ester. The above polymers can be blended with ionic and non-ionic thermoplastic and thermoplastic elastomeric materials to obtain a desirable mechanical property.

(13) HiCrystalline acid copolymers and their ionomers, including: acid copolymers or its ionomer derivatives formed from an ethylene and carboxylic acid copolymer comprising about 5 to 35 percent by weight acrylic or methacrylic acid, wherein said copolymer is polymerized at a temperature of about 130° C. to about 200° C. and a pressure of about 20,000 to 50,000 psi and wherein up to about 70 percent to of the acid groups were neutralized with a metal ion.

(14) Oxa acid compounds including those containing oxa moiety in the backbone having the formula

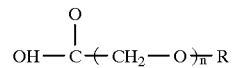

where R has the formula
where R' is an organic moiety selected from the group consisting of alkyl, carbocyclic and heterocyclic groups and "n" is an integer greater than 1. Also, R' has the formula

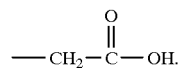

(15) Fluoropolymer including those having the following formula:

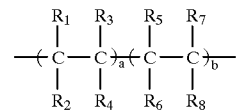

in which a is a number from 1 to 100, 6 is a number from 99 to 1, $R_1$–$R_7$ are independently selected from the group consisting of H, F, alkyl and aryl, and $R_8$ is H, F or a moiety of the formula:

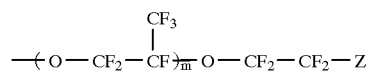

in which m is a number from 1 to 18 and Z is selected from the group consisting of $SO_2F$, $SO_3H$, $SO_3M^{v+}$, COF, $CO_2H$ and $CO_2M^{v+}$, wherein v is the valence of M and M is a cation selected from Group I, Ia, IIa, IIb, IIIa, IIIb, 1Va, IVb and transition elements.

(16) Mg ionomers formed from an olefin and carboxyllic acid copolymer comprising about 5 to 35 weight percent of acrylic or methacrylic acid which are neutralized up to 60 weight percent by magnesium oxide or magnesium acetate or magnesium hydroxide.

Preferably, the cover 11 is comprised of polymers such as ethylene, propylene, butene-1 or hexane-1 based homopolymers and copolymers including functional monomers such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethylene vinyl alcohol), poly(tetrafluoroethylene) and their copolymers including functional comonomers and blends thereof. Still further, the cover 11 is preferably comprised of a polyether or polyester thermoplastic urethane, a thermoset polyurethane, an ionomer such as acid-containing ethylene copolymer ionomers, including E/X/Y copolymers where E is ethylene, X is an acrylate or methacrylate-based softening comonomer present in 0–50 weight percent and Y is acrylic or methacrylic acid present in 5–35 weight percent. The acrylic or methacrylic acid is present in 16–35 weight percent, making the ionomer a high modulus ionomer, in 10–12 weight percent, making the ionomer a low modulus ionomer or in 13–15 weight percent, making the ionomer a standard ionomer. Generally, high acid ionomers provide a harder, more resilient ionomer. Covers made using high acid ionomers usually provide a high initial velocity and a low spin rate. on the other hand, covers made with a low modulus ionomer are generally softer and provide greater spin and control.

The solid, non-wound core portion 16 is made of at least a first, solid, non-wound layer 20 surrounding the liquid or fluid filled cavity or center 18 and a second layer 22 surrounding the first layer 20. The first layer 20 is preferably made of a thermoset rubber such as polyisoprene, styrene butadiene, polybutadiene and combinations thereof; a plastic, such as polypropylene; or an elastomeric or non-elastomeric thermoplastic material such as copolymers of methyl-methacrylate with butadiene and styrene, copolymers of methyl-acrylate with butadiene and styrene, acrylonitrile styrene copolymers, polyether-ester, polyether-amide, polyurethane and/or blends thereof.

As discussed in more detail below, one embodiment of the present invention is comprised of a fluid filled center with a high compression core, i.e., a core having a compression of about 80 or more. The preferred first layer 20 for this embodiment is comprised of a non-elastomeric thermoplastic material as described above. The first layer 20 can also be made of a light-weight metallic material, such as aluminum. The desired properties for this embodiment are that the material is relatively stiff to provide little compression or deformation under compressive load.

Figure 2:
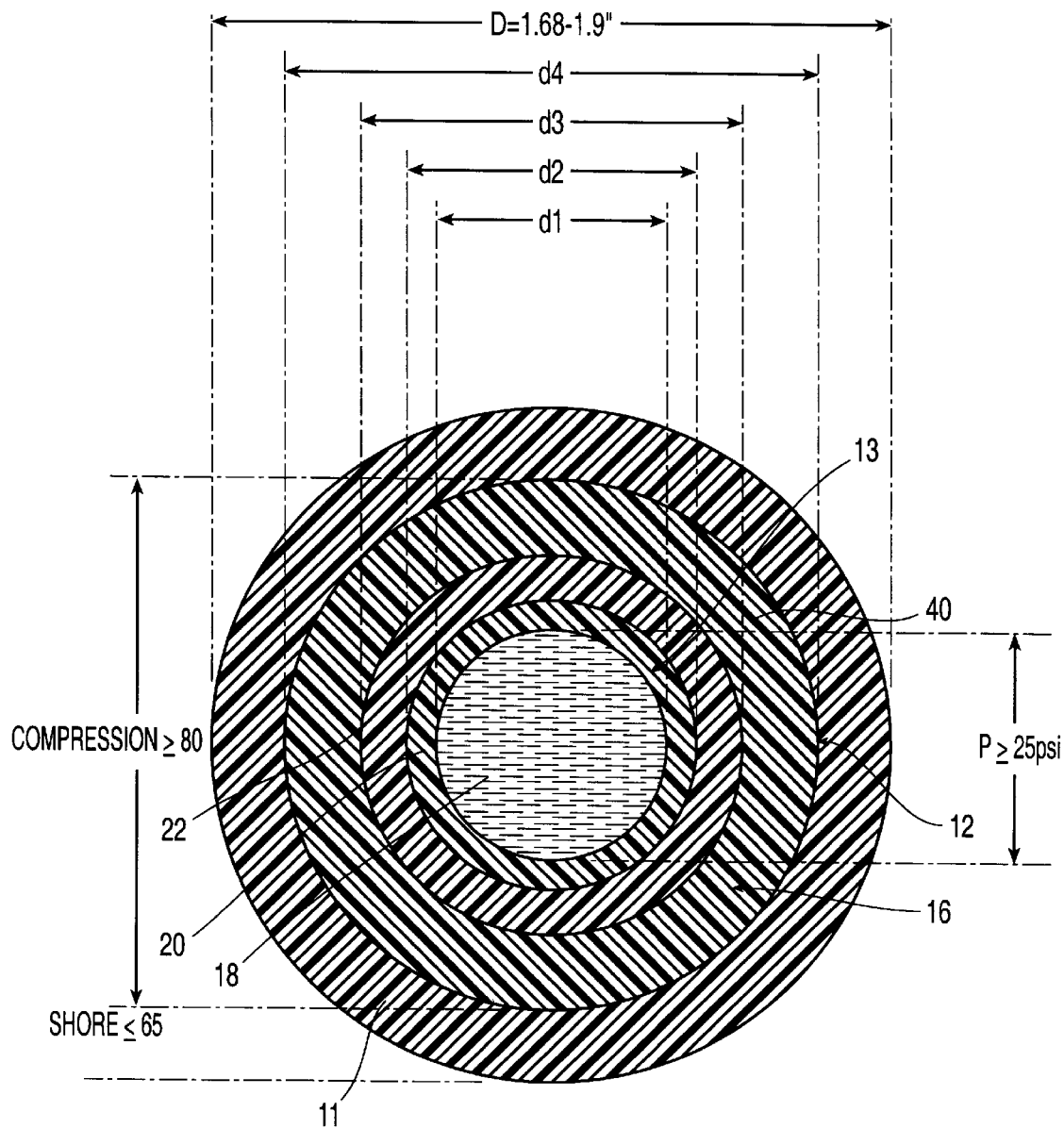
FIG. 2 is a sectional view of a ball according to the present invention with multiple non-wound core and cover layers around an inner sphere.

The solid, non-wound portion 16 also comprises the second, solid, non-wound layer 22 surrounding the first layer 20. The second layer is also a non-wound solid material. The second layer 22 is shown as a single layer in FIG. 1 and as two layers 22 and 40 in FIG. 2. The second layer 22 is preferably made of thermoset rubber such as polyisoprene, styrene butadiene, polybutadiene and combinations thereof or thermoplastic elastomeric materials such as copolymers of methyl-methacrylate with butadiene and styrene, copolymers of methyl-acrylate with butadiene and styrene, acrylonitrile styrene copolymers, polyether-ester, polyether-amide, polyurethane and/or blends thereof. As discussed in more detail below, the second layer 22 provides a significant opportunity to alter the playing characteristics of the golf ball. Thus, the second layer is preferably thicker than the first layer 20. More particularly, the second layer 22 can be changed by adding fillers to alter the specific gravity, or can be made from materials that will provide different compressions and/or hardnesses. For example, a polybutadiene type rubber material that is neutralized with zinc oxide and has greater than about 3% zinc diacrylate can provide a relatively stiff material for a higher compression golf ball as those skilled in the art well understand. Alternatively, the second layer may comprise of a polybutadiene type rubber material neutralized with a calcium oxide for a softer core that will provide a softer feel and less driver spin. Moreover, as shown in FIG. 2, the second layer 22 and 40 can be comprised of more than one material so that the different radii within the core have different hardnesses or compressions. Preferably, the inner portion 22 of the second layer is softer than the outer portion 40. As those skilled in the art know, this may be accomplished with a single material, but the use of two or more materials provide a greater opportunity to drastically vary the physical properties of the ball radially.

The solid, non-wound portion 16 preferably has an outside diameter in the range of 80 to 98% of the finished ball diameter and an inner diameter in the range of 30 to 70% of the finished ball diameter. Preferably, solid, non-wound portion 16 and the first layer 20 have an inner diameter of approximately 0.5 to 1.18 inches and, more preferably, an inner diameter of approximately 0.75 to 1.1 inches. Preferably, the portion 16 and first layer 20 have an inner diameter of approximately 0.9 to 0.95 inches. The second layer 22 preferably has an inner diameter in the range of 0.55 to 1.45 inches and, more preferably, approximately 0.8 to 1.3 inches. Yet further still, the portion 16 and the second layer 22 have an outside diameter in the range of 1.3 to 1.65 inches and, more preferably, approximately 1.45 to 1.62 inches. A golf ball incorporating these measurements can be designed with the various attributes discussed below, such as specific gravity, resiliency and hardness, to provide the desired playing characteristics, such as spin rate and initial velocity. More particularly, by using a first layer to surround the fluid or liquid center and at least a second non-wound layer, the specific gravities, resiliency, compression and other properties can be tailored to provide optimum playing characteristics. More particularly, by constructing a ball according to these dimensions, the second layer is made with a significant volume compared to the fluid mass at the center. Preferably, the volume of the second layer is greater than the volume of the fluid mass at the center. More preferably, the volume of the second layer is about 2 to 4 times the volume of the fluid mass at the center. Thus, the properties of the second layer can effect the playing characteristics of the ball.

The hardness and resiliency of the solid portion 16 can be varied to achieve certain desired parameters such as spin rate, compression and initial velocity.

Preferably, the solid portion 16 has a hardness of approximately 30 to 95 Shore C, and more preferably, 45 to 90 Shore C. Still further, the portion 16 has a resiliency greater than 40 bashore.

In a most preferred embodiment, the first layer 20 is comprised of a plastic or thermoplastic material having high temperature resistance and is elastomeric or non-elastomeric. The second layer 22 is comprised of a polybutadiene material that has high specific gravity for a low spin rate ball and a low specific gravity for a high spin rate ball. It is known that the specific gravity of the polybutadiene material can be varied by adding fillers known to those skilled in the art.

The fluid cavity or center 18 can be filled with a wide variety of materials including gas, water solutions, gels, foams, hot-melts, other fluid materials and combinations thereof. The fluid or liquid in the center 18 can be varied to modify the performance parameters of the ball, such as the moment of inertia. Preferably, the fluid or liquid in the cavity 18 is comprised of a material that has a high specific gravity for high spin rate golf balls and a material that has a low specific gravity for a low spin rate golf ball.

Preferably, the specific gravity of the fluid or liquid is below or equal to 1.2 for low specific gravity centers and above 1.2 for high specific gravity centers. More preferably, the specific gravity is approximately 1.15–1.2 for low specific gravity centers and approximately 1.3–1.55 for high specific gravity centers. Still further, the fluid is preferably comprised of a material with a low viscosity for a golf ball having a high spin rate and a material having a high viscosity for a golf ball having a low spin rate.

Preferably, the viscosity of the fluid or liquid center is less than 100 cps for low viscosity centers and greater than or equal to 100 cps for high viscosity centers. More preferably, the viscosity of the fluid or liquid center is less than or equal to 10 cps for low viscosity centers and is between 100 and 1500 cps for high viscosity centers. Most preferably, the fluid or liquid center viscosity is approximately 500 cps for high viscosity centers.

Examples of suitable liquids include either solutions such as salt in water, corn syrup, salt in water and corn syrup, glycol and water or oils.

The liquid can further include pastes, colloidal suspensions, such as clay, barytes, carbon black in water or other liquid, or salt in water/glycol mixtures. Examples of suitable gels include water gelatin gels, hydrogels, water/methyl cellulose gels and gels comprised of copolymer rubber based materials such a styrene-butadiene-styrene rubber and paraffinic and/or naphthionic oil. Examples of suitable melts include waxes and hot melts. Hot-melts are materials which at or about normal room temperatures are solid but at elevated temperatures become liquid. A high melting temperature is desirable since the liquid core is heated to high temperatures during the molding of the second layer and the cover.

The liquid in the cavity 18 can be a reactive liquid system which combine to form a solid or internal pressure within the first layer 20. Examples of suitable reactive liquids that form solids are silicate gels, agar gels, peroxide cured polyester resins, two part epoxy resin systems and peroxide cured liquid polybutadiene rubber compositions. It is understood by one skilled in the art that other reactive liquid systems can likewise be utilized depending on the physical properties of the first layer 20 and the physical properties desired in the resulting finished golf balls.

Suitable gases include air, nitrogen and argon. Preferably, the gas is a large-molecule gas and is inert. Preferably, the gas has an atomic weight of about 14 or greater and can be pressurized. Preferably, the fluid center can be pressurized to an internal pressure of about 25 psi or greater at a temperature of 70 degrees Fahrenheit.

The core 12 is preferably 60 to 95% of the total ball weight and more preferably, 75 to 86% of the ball weight. As stated above, the weight distribution within the core 12 can be varied to achieve certain desired parameters such as spin rate, compression and initial velocity.

For example, by increasing the diameter of the fluid or liquid filled center cavity 18, and increasing the specific gravity of the solid, non-wound portion 16, the weight distribution of the core is moved toward the outer diameter for a lower spin rate ball. In contrast, the diameter of the fluid or liquid filled center 18 can be decreased and the specific gravity of the solid, non-wound layer 16 decreased to move the weight distribution of the ball towards the ball center for a high spin rate ball.

Similarly, the specific gravity of the fluid or liquid filled center can be decreased and the specific gravity of the solid, non-wound portion 16 increased for a low spin rate ball. Alternatively, the specific gravity of the fluid or liquid filled center 18 can be increased and the specific gravity of the solid, non-wound portion 16 decrease for a high spin rate ball.

Figure 3:
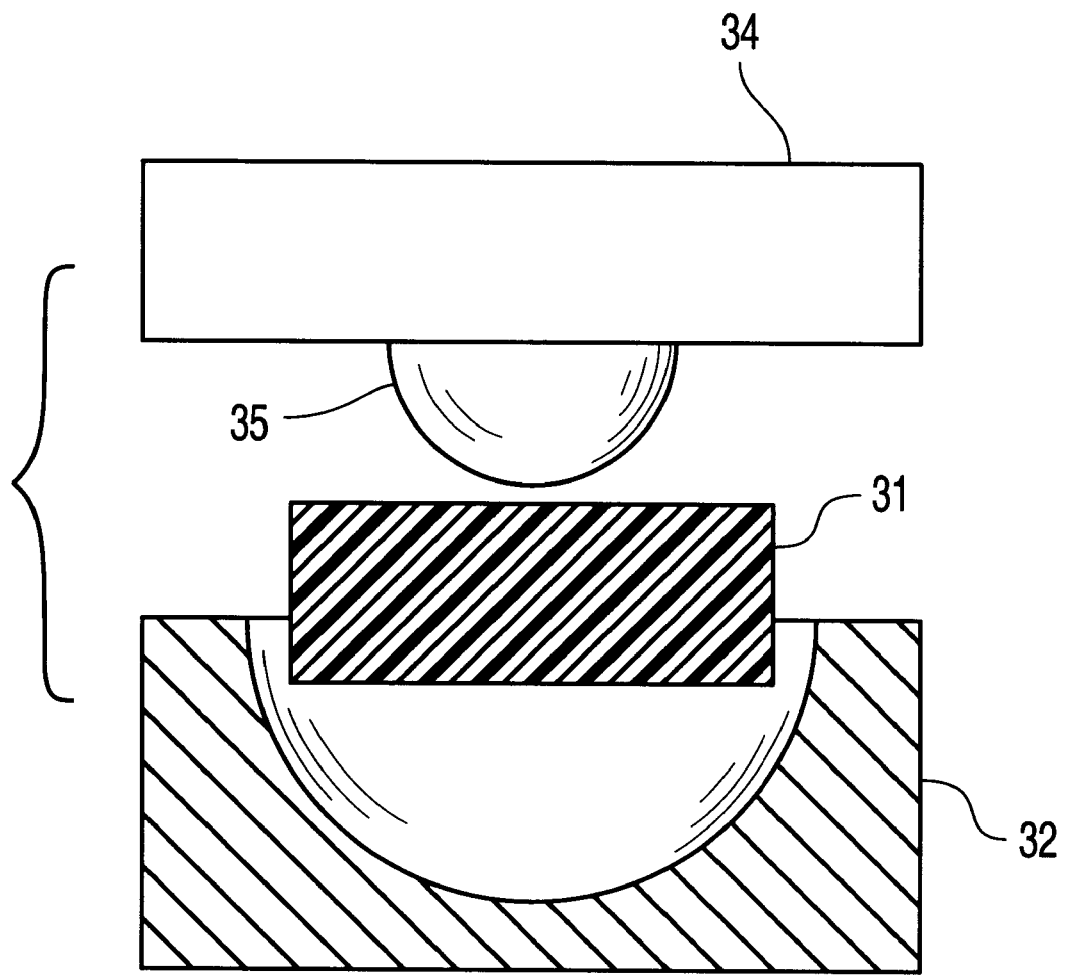
FIG. 3 is a sectional view of a mold preforming a single cup for a non-wound, core layer.

Turning to the preferred method for making the ball illustrated in FIG. 3, the inner sphere is produced by forming the first layer 20 to create a central cavity, and filling the cavity with the fluid mass in the center 18. A first cup is made by compression molding cup material 31, between a first substantially hemispherical concave mold part 32 and a protrusive mold part 34. The protrusive mold part 34 has a first substantially hemispherical protrusion 35 that faces the first concave mold part 32. A second cup is then made in the same manner.

Figure 4:
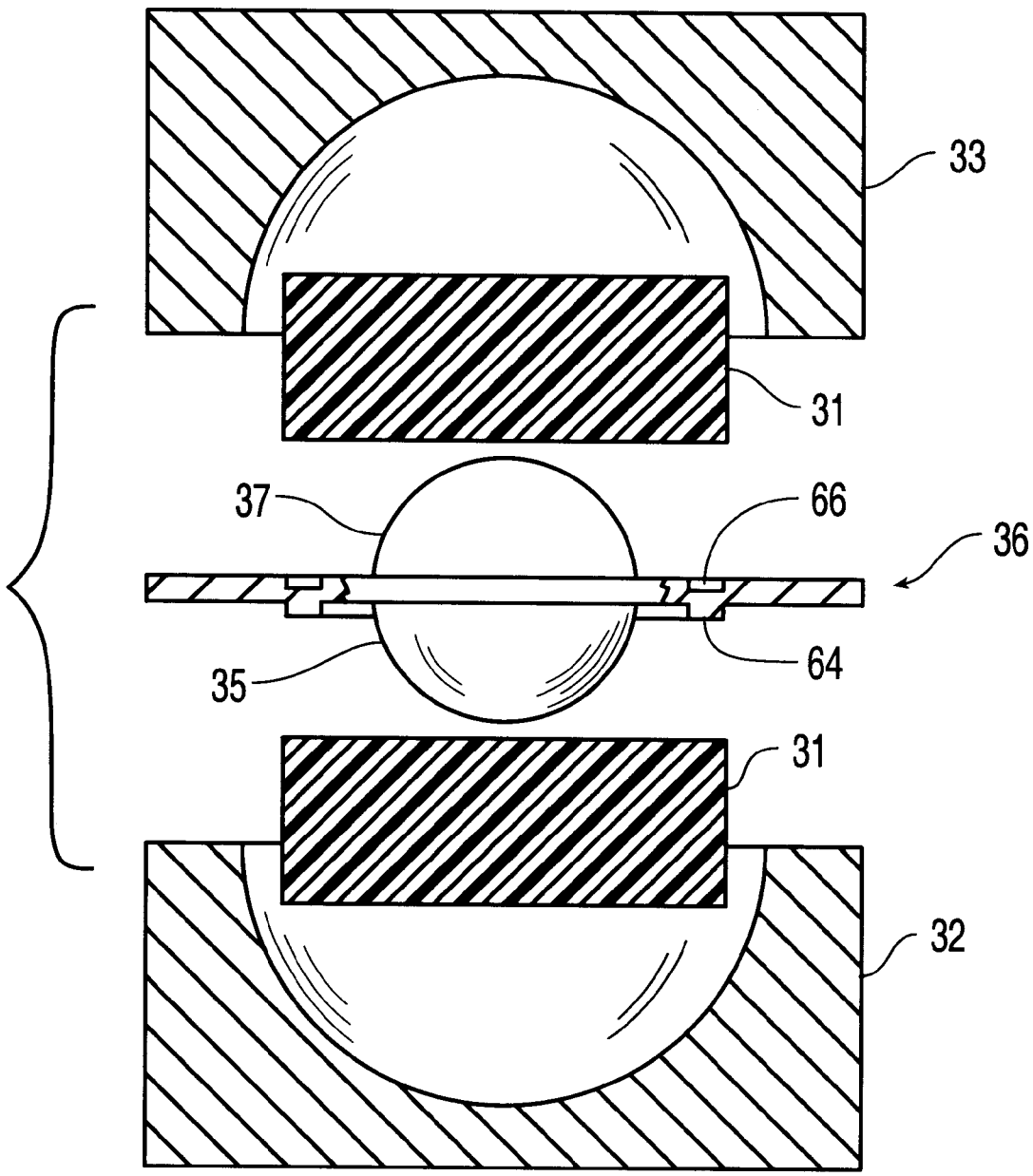
FIG. 4 is a sectional view of molds preforming a layer's cups according to the present invention.

Alternatively, as shown in FIG. 4, the two cups 30 are simultaneously compression molded about a single protrusive mold part 36 that has first and second protrusions 35 and 37. First and second hemispherical molds 32 and 33 are positioned opposite each other and protrusive mold part 36 is placed between the hemispherical molds 32 and 33.

Figure 5:
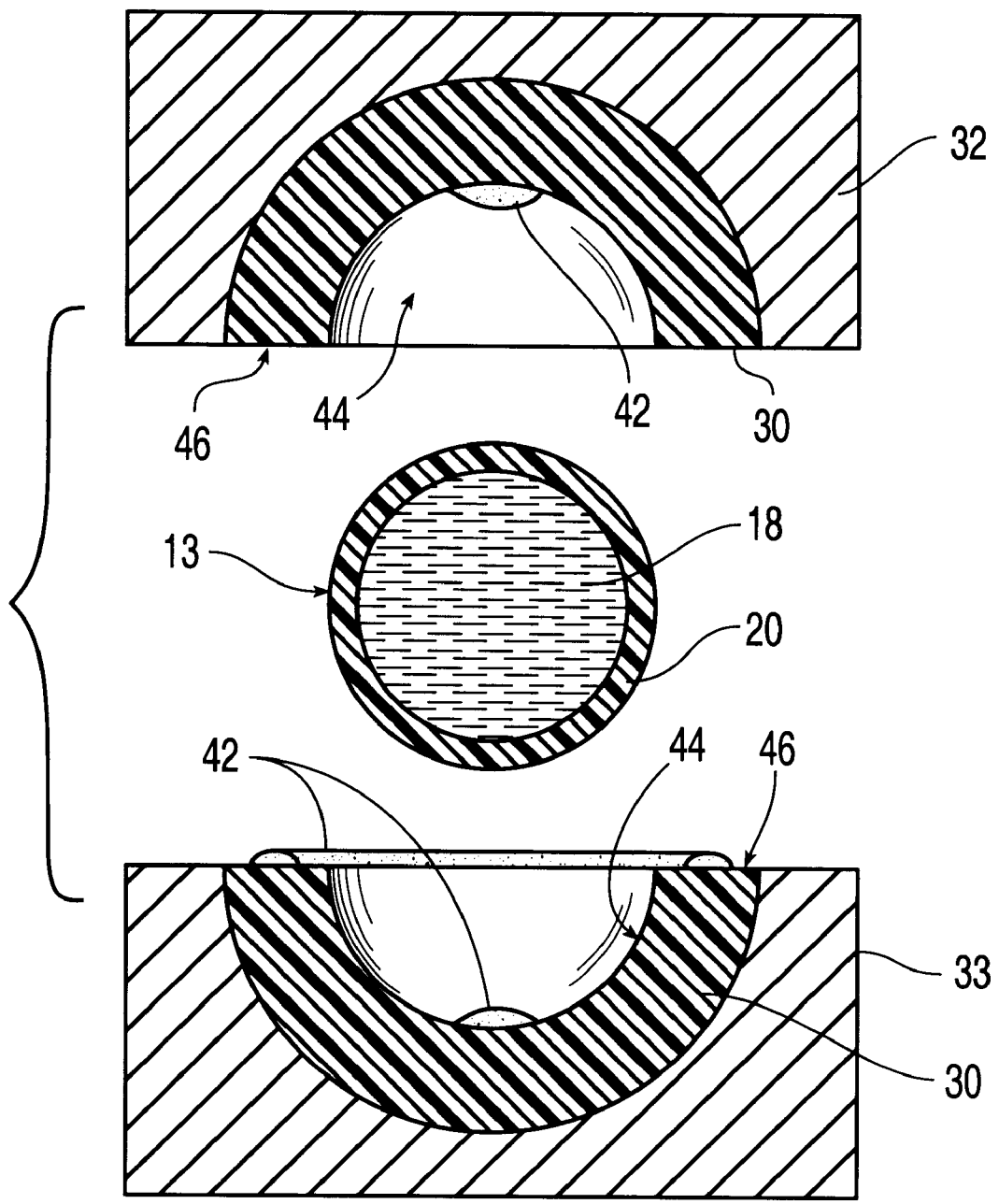
FIG. 5 is a sectional view of molds joining cups of a golf ball non-wound, core layer.

FIG. 5 shows two concave mold parts 32 and 33 after cups 30 have been molded. Each hemispherical cup 30 has a hemispherical cavity 44. Disposed around the cavities 44, the cups 30 have mating surfaces 46, which are substantially flat in this embodiment.

At this point in the process, the inner sphere 13 is placed in the cups 30, and the two cups 30 are joined. Cups 30 are preferably kept in their respective hemispherical molds 32 and 33 during this step. The preferred method for joining the cups 30 is to place adhesive 42 between the cups by applying the adhesive to one of the cups 30 as shown in FIG. 5. The cups 30 are then brought together, squeezing the adhesive evenly across the mating surfaces of the cups 30. The adhesive 42 then sets and bonds the cups 30 to one another. The adhesive is also preferably applied such that it bonds the inner sphere 13 to the cups 30 by placing adhesive 42 within the cavities. As with the adhesive 42 placed between cups, the adhesive 42 placed between the cups 30 and the inner sphere 13 is spread evenly upon joining the cups 30 to one another. The hemispherical cavities 44 of the joined cups together form a spherical cavity, occupied by the inner sphere 12.

Another method for joining the cups 30 is to compress them together at an elevated temperature to cause crosslinking between the elastomeric cup material of each cup 30. In the embodiment shown in FIG. 4, this may be achieved by removing protrusive mold part 36, and running the compression mold through a second cycle, heating and compressing the cups 30 together.

Figure 6:
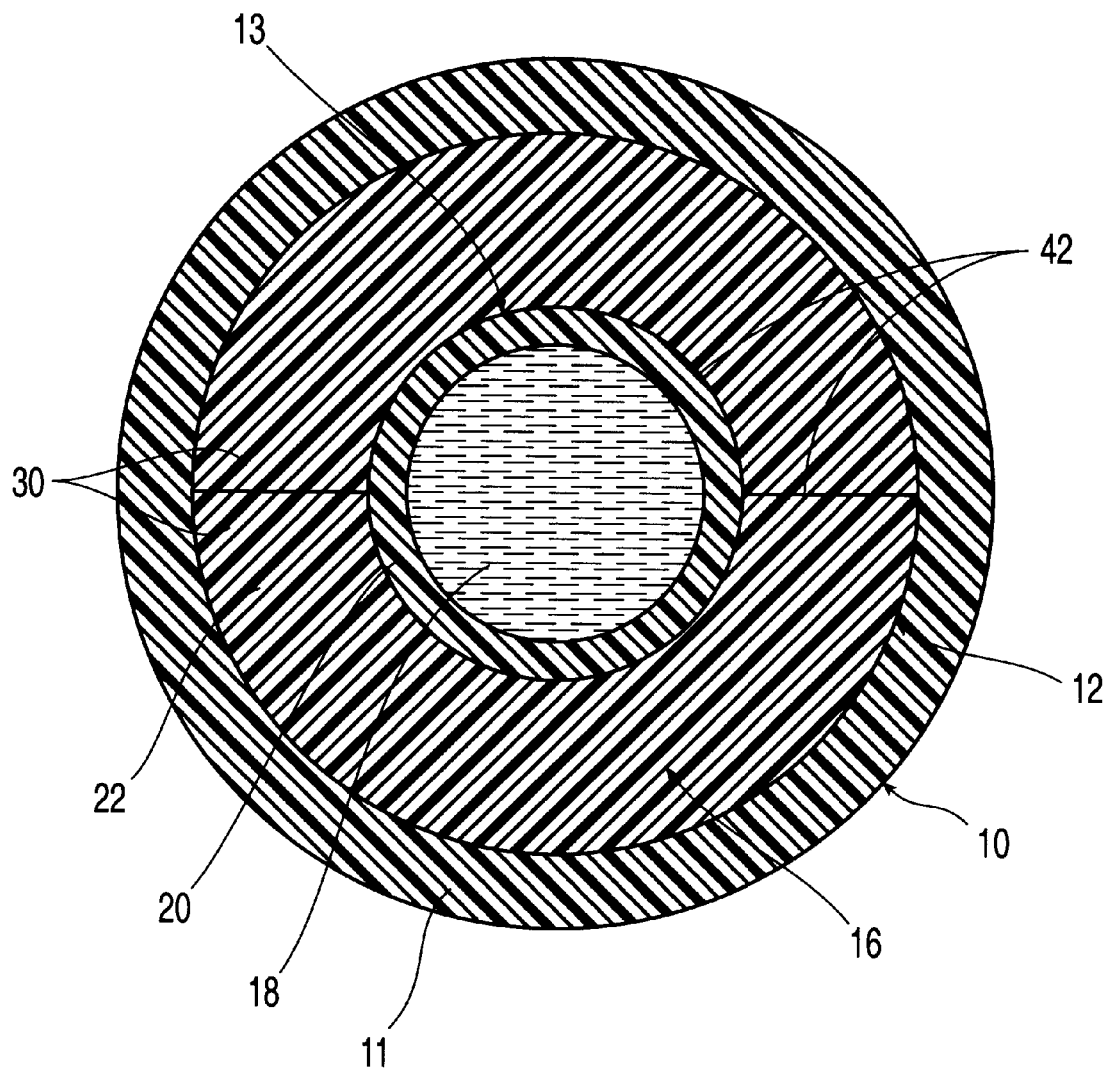
FIG. 6 is a sectional view of a ball according to the invention having adhesively joined cups forming a non-wound, core layer.

FIG. 6 shows the inner sphere 13 and the cups 30 prior to their being joined. In this embodiment, the inner sphere is merely a sphere of frozen fluid 18 that placed between the cups 30, and around which the cups 30 are joined, preferably before the fluid 18 begins to melt.

Figure 7:
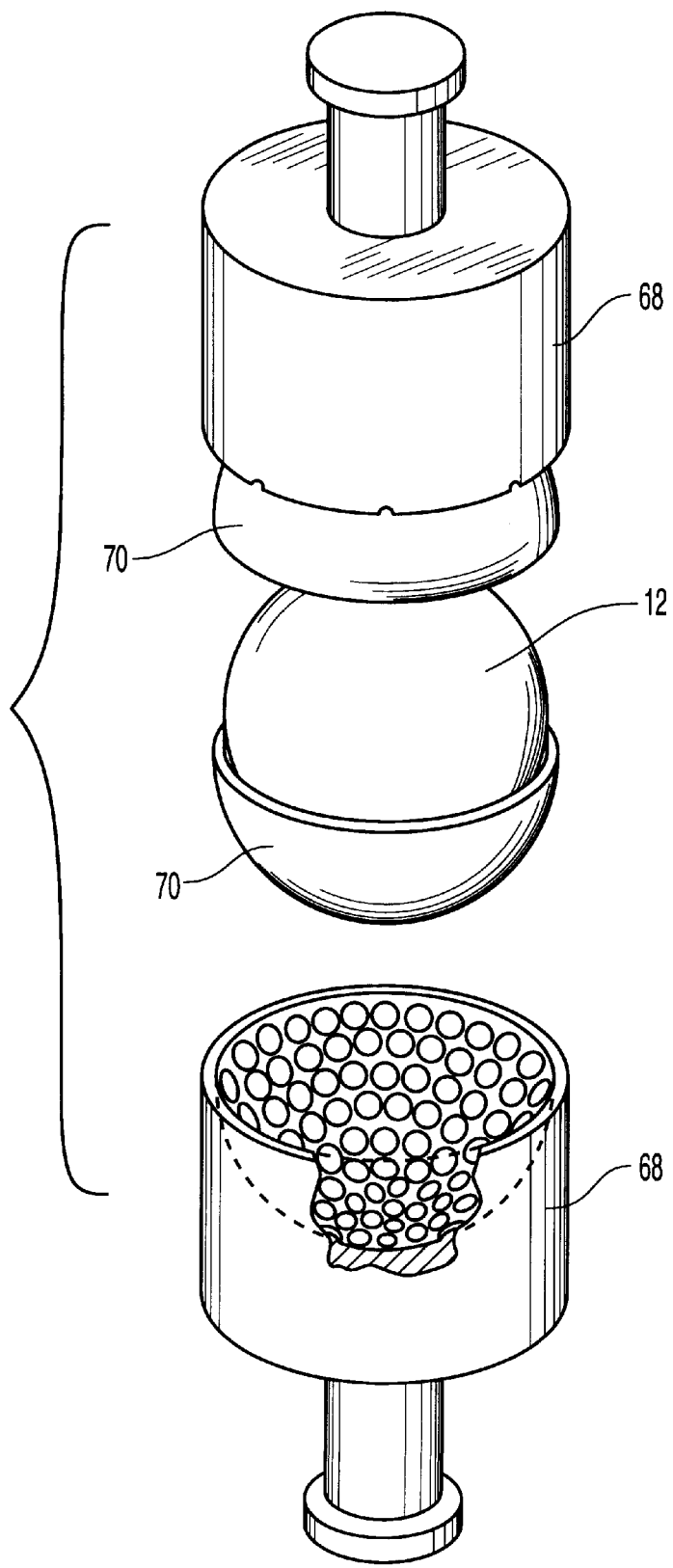
FIG. 7 illustrates a compression mold forming a cover around a golf ball core.
Figure 8:
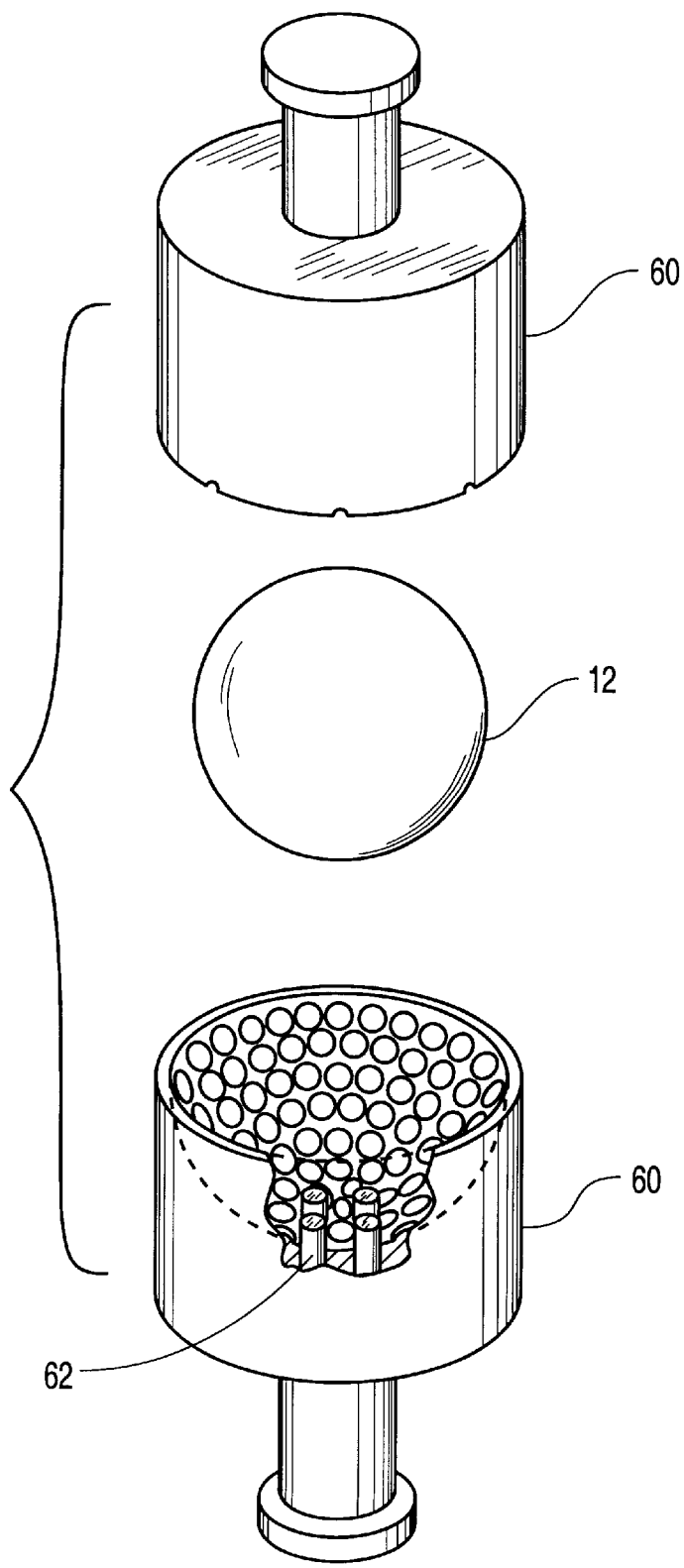
FIG. 8 shows an injection mold forming a cover around a core.

Once the cups 30 are joined, the cover 11 is formed around the core 12, as seen in FIG. 7. FIG. 7 illustrates a step of compression molding two halves 70 of a cover 11 around the core 12 in a dimpled mold 68. FIG. 8 shows a step of injection molding the cover 11 around the core 12 in a dimpled mold 60 with pins 62 that position the core 12 within the dimpled mold 60 and retract before the cover 11 cures completely.

The golf ball of FIG. 7 has been formed by adhesively joining the cups 30. Adhesive 42 extends between the cups in the second layer 22, and between the each cup 30 and the inner sphere 13. The adhesive 42 preferably has an adhesive strength that is greater than the cohesive strength of the elastomeric cup material. Thus, a ball can be manufactured that is at least as strong as a ball in which the layer is made from a single piece of cup material, because the elastomer forming the cups 30 will fail under a lighter load than the adhesive 42. Ideally, the adhesive 42 is flexible in its cured state and has physical properties similar to those of the cup material employed.

A preferred adhesive for use with polybutadiene cups 30 is an epoxy, formed by blending low viscosity liquid resins, and formulated to be flexible in its cured state. A suitable epoxy is formed by mixing an approximately 1:1 volume ratio of about 83 parts by weight of AB-82 hardener into 100 parts by weight of Epoxy Resin #1028, both of which are sold by RBC Industries, Inc. In its liquid state, the epoxy is ideal for use in metering, mixing, and dispensing equipment. This epoxy is preferably cured at 77° F. for 18 to 24 hours, at 95° F. for 6 hours, at 120° F. for 3 hours, or at 150° F. for 1 hour. The cured adhesive's physical properties resemble those of elastomeric urethane. It exhibits an Izod impact strength of 5.50 ft. lbs./in. of notch, a tensile strength at 25° C. of 2,200 psi, a compressive strength at 25° C. of 6,000 psi, and a shore D hardness of 45. Preferably, the shore D of the cured adhesive is within 20 shore D of the hardness of the elastomeric cup material. Other preferred adhesives are those adhesives containing cyanoacrylate.

Figure 9:
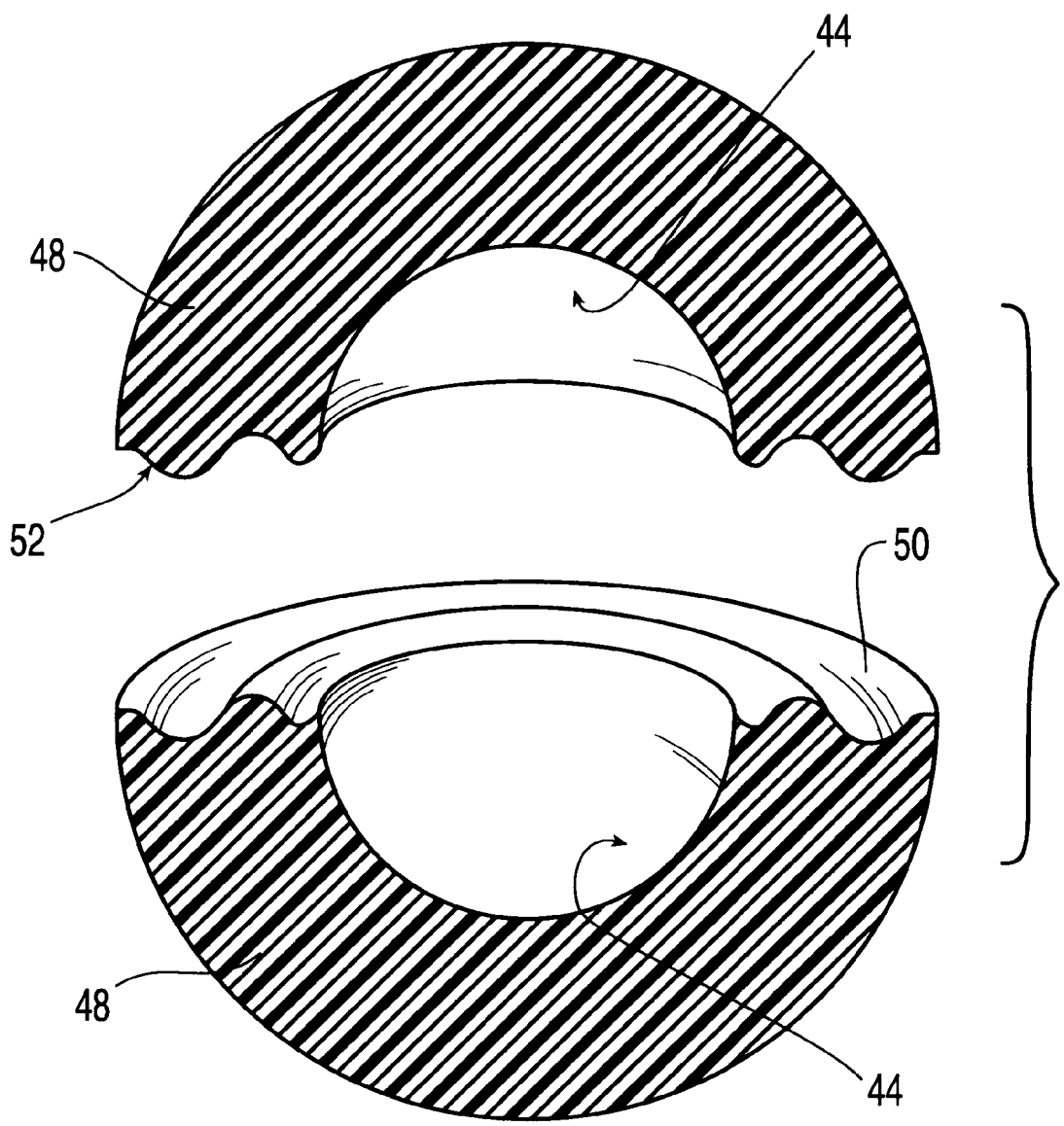
FIGS. 9 and 10 are sectional views of non-wound, core layer cups with nonplanar mating surfaces that mesh with one another.
Figure 10:
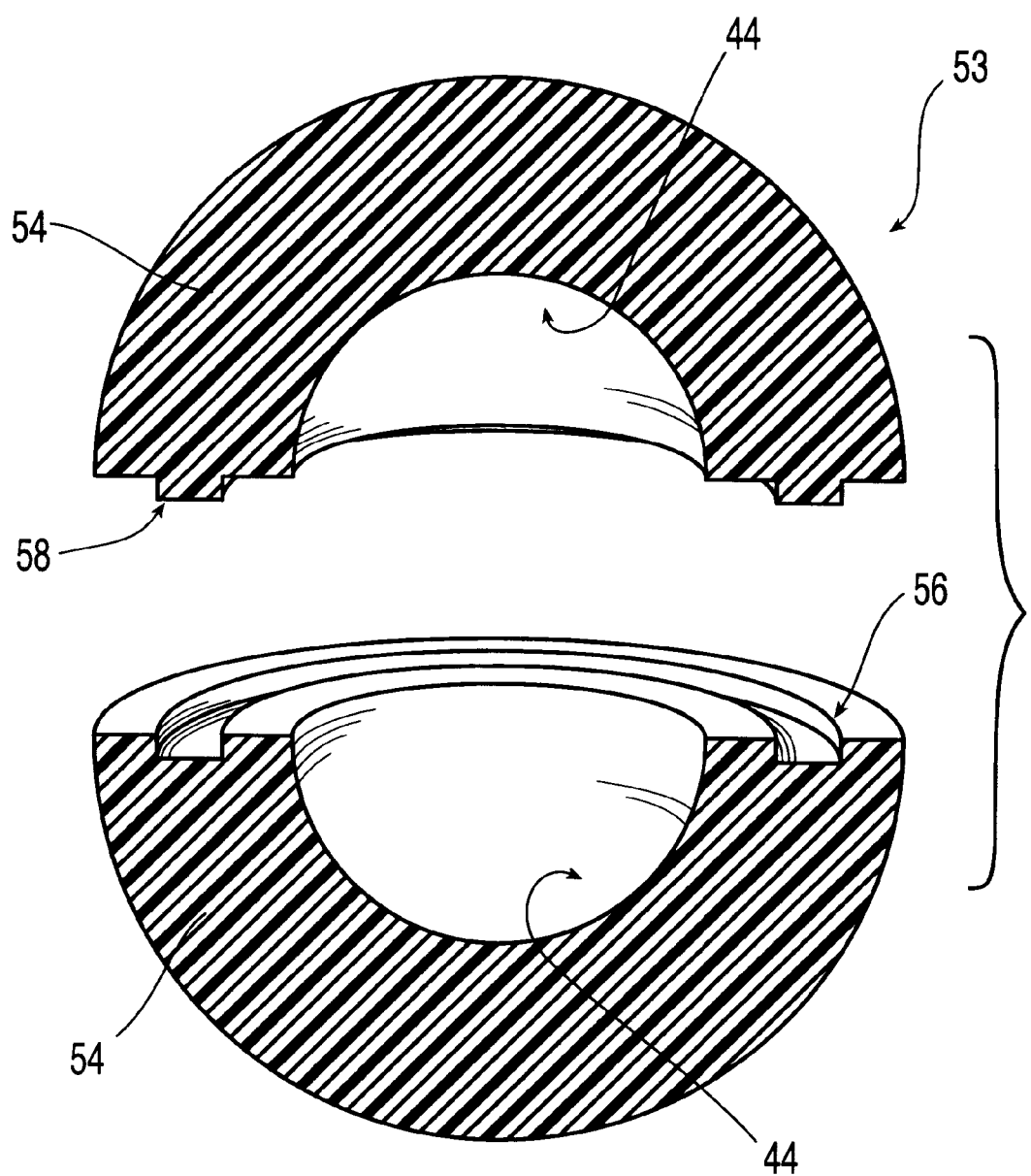

FIGS. 9 and 10 show alternative embodiments of cups 48 and 54. Instead of having flat mating surfaces, cups 48 and 54 have nonplanar mating surfaces 50 and 52, and 56 and 58. These surfaces 50 and 52, and 56 and 58 each have a circular pattern of ridges that is preferably symmetrical about the cavity 44 of each cup 48 and 54; the patterns shown are concentric with the cups 48 and 54. In ball 53, surface 58 has a tongue that engages a groove of surface 56. In the finished golf balls 47 and 53, nonplanar surfaces 50 and 52 are arranged to mesh with each other, as are nonplanar surfaces 56 and 58. These nonplanar mating surfaces 50 and 52 are preferably formed by molding the cups 48 or 54 with protrusive mold parts that have nonplanar surfaces surrounding their protrusions, such as the protrusive mold part 36 with nonplanar surfaces 64 and 66, as shown in FIG. 4.

The layers in the solid, non-wound portion 16 of golf balls with nonplanar mating surfaces retain more of the properties of the elastomers that form the cups, when the cups are forced in shear with respect to each other, as compared to a golf ball with flat mating surfaces. Nonplanar mating surfaces are thus advantageous when an adhesive is used that has an adhesive strength lower than the cohesive strength of the elastomeric cup material. This is because the meshed portions of the cups 48 and 54 aid in resisting shearing forces between the two cups 48 and 54.

Still further, the second layer 22 may be cast over the first layer 20. Moreover, to make the ball disclosed in FIG. 3, it may be desirable to cast the outer layer 40 about the inner layer 22. This can be accomplished by using a castable polybutadiene or other material to form the outer layer 40.

Various examples of golf ball cores according to the invention are set forth below.

EXAMPLE 1

A core according to the present invention was created having a liquid center, a first layer surrounding the liquid and a second layer surrounding the first layer.

The liquid was a salt, water and corn syrup solution comprised of 40% salt, 30% water and 30% corn syrup. The liquid mass at the center had an outside diameter of approximately 0.965 inches.

The first layer was created from a thermoplastic elastomer. The first layer had an outside diameter of approximately 1.125 inches. As set forth above, the first layer can be comprised of a non-elastomeric thermoplastic.

The second layer was created from crosslinked polybutadiene. The second layer had an outside diameter of approximately 1.51 inches.

EXAMPLE 2

A core according to the present invention was created having a liquid center, a first layer surrounding the liquid and a second layer surrounding the first layer.

The liquid was a salt, water and corn syrup solution comprised of 40% salt, 30% water and 30% corn syrup. The liquid filled center had an outside diameter of approximately 0.938 inches.

The first layer was created from polypropylene. The first layer had an outside diameter of approximately 1.0625 inches.

The second layer was created from crosslinked polybutadiene. The second layer had an outside diameter of approximately 1.51 inches.

The core weighed 33.4 g and had a compression of approximately 60.

EXAMPLE 3

A core according to the present invention was created having a fluid center, a first layer surrounding the fluid and a second layer surrounding the first layer.

The fluid was air. The fluid center had an outside diameter of approximately 0.938 inches.

The first layer was created from polypropylene. The first layer had an outside diameter of approximately 1.0625 inches.

The second layer was created from crosslinked polybutadiene. The second layer had an outside diameter of approximately 1.51 inches.

The core weighed 26 g and had a compression of approximately 87.

EXAMPLE 4

A core according to the present invention was created having a fluid center, a first layer surrounding the fluid and a second layer surrounding the first layer.

The fluid was a solution of salt in water and corn syrup as is well known in the art. The fluid center had an outside diameter of approximately 0.938 inches.

The first layer was created from PEBAX, an elastomeric thermoplastic. The first layer had an outside diameter of approximately 1.0625 inches.

The second layer was created from crosslinked polybutadiene as is well known in the art. More particulaly, the second layer was formed from a polybutadiene with zinc oxide and zinc diacrylate present in an amount of greater than 35 parts per hundred parts of polybutadiene in order to make a very hard second layer. It had an outside diameter of approximately 1.51 inches.

Thus, the core had a soft liquid filled center and a harder second layer.

Turning to FIGS. 2 and 3, a golf ball of the present invention can be formed by initially forming the first layer 20 to create cavity or center 18 and filling the cavity 18 with fluid or liquid. The second layer is formed by pre-forming top and bottom cups 30 and 31 of polybutadiene in a compression mold 32 with an inner fixture 34 as shown in FIG. 2. The mold 32 is then opened and the inner fixture 34 is removed, leaving a preform 36 in the top and bottom cups 30 and 31 of the second layer. The first layer 20 and fluid or liquid center 18 are then inserted into the bottom cup 31 and the mold 32 is closed and run through a normal temperature and pressure cycle to crosslink the second layer 22 to form the core 12. The cover 11 is then compression molded or injection molded over the core 12, which processes are well known in the art.

The weight of the ball according to the present invention is preferably about 1.620 ounces avoirdupois (45.92 gm) or less for low swing speed players. Further, the ball preferably does not cover an average distance in carry and roll exceeding 280 yards (256 m) plus a tolerance of 6% when tested on apparatus approved by the USGA on the outdoor range at the USGA Headquarters under the conditions set forth in the Overall Distance Standard for golf balls on file with the USGA.

While it is apparent that the illustrative embodiments of the invention herein disclosed fulfills the objectives stated above, it will be appreciated that numerous modifications and other embodiments may be devised by those skilled in the art. Therefore, it will be understood that the appended claims are intended to cover all such modifications and embodiments which come within the spirit and scope of the present invention.

What is claimed is:

1. A golf ball having a diameter and being comprised of a core and a cover, wherein the core is further comprised of a fluid mass at the center of the ball, a first layer surrounding the fluid mass and a second, solid, non-wound layer surrounding and abutting the first layer, wherein the first layer has an inner diameter of 30 to 70% of the ball diameter and is a polymer material selected from the group of thermoset rubber, plastic, and thermoplastic material and the second layer has an outer diameter of 80 to 98% of the ball diameter and the second layer is a polymer material selected from the group of thermoset rubber materials and thermoplastic materials.

2. The golf ball of claim 1 wherein the first layer is made from a non-elastomeric thermoplastic material.

3. The golf ball of claim 1 wherein the second layer is made of an elastomeric thermoplastic material.

4. The golf ball of claim 1, wherein the cover is comprised of a material selected from the group of polyether and polyester thermoplastic urethane, thermoset polyurethane, ionomer resins, low modulus ionomers, high modulus ionomers and blends thereof.

5. The golf ball of claim 1 wherein the fluid mass at the center, the first layer and the second layer are comprised such that the core has a compression of greater than about 80.

6. The golf ball of claim 5 wherein the fluid mass has a pressure of about 25 psi or greater at 70 degrees Fahrenheit.

7. The golf ball of claim 5 wherein the cover has a Shore D hardness of less than about 65.

8. The golf ball of claim 1 wherein the golf ball has a weight of less than 1.62 ounces.

9. The golf ball of claim 8 wherein the golf ball has a weight of about 1.54 to about 1.56 ounces.

10. The golf ball of claim 9 wherein the fluid mass at the center is a gas at 70 degrees Fahrenheit.

11. The golf ball of claim 10 wherein the gas has an atomic weight of 14 or greater.

12. The golf ball of claim 1 wherein the second layer is comprised of more than one layer.

13. The golf ball of claim 12 wherein the second layer is comprised of an inner layer and an outer layer.

14. The golf ball of claim 13 wherein the inner layer is harder than the first layer and the outer layer is harder than the inner layer.

15. The golf ball of claim 13 wherein the inner layer is softer than the first layer and the outer layer is softer than the inner layer.

16. The golf ball of claim 15 wherein the cover is harder than the outer layer.

17. The golf ball of claim 1 wherein the first layer is comprised of an elastomeric thermoplastic material.

18. The golf ball of claim 17 wherein the second material is comprised of a thermoset rubber and the fluid mass, the first layer and second layer are comprised such that the core has a compression of less than about 80.

19. The golf ball of claim 18 wherein the cover has a Shore D hardness of about 65 or greater.

20. The golf ball of claim 17, wherein the second layer is harder than the first layer.

21. The golf ball of claim 1 wherein the cover has an outer surface area and further comprises a plurality of dimples formed therein covering more than about 70% of the outer surface area.

22. The golf ball of claim 21 wherein the dimples are comprised of at least two different dimple diametered dimples and the average dimple diameter is about 0.1 to about 0.17 inches.

23. A golf ball having a diameter of approximately 1.68 to 1.90 inches and comprising:
    a core comprising:
    i) a fluid mass at the center having an internal pressure of greater than about 25 psi at 70 degrees Fahrenheit;
    ii) a first, solid, non-wound layer surrounding the fluid center comprised of a non-elastomeric material selected from the group of thermoplastic material, metal and plastic and having an inner diameter in the range of 30 to 70% of the ball diameter;
    iii) a second, solid, non-wound layer surrounding the first layer comprised of an elastomeric polymer material selected from the group of thermoset rubber material and thermoplastic elastomeric material and having an outer diameter in the range of 80 to 98% of the ball diameter; and
    a cover surrounding the core.

24. The golf ball of claim 23 wherein the core has a compression of about 80 or greater.

25. The golf ball of claim 24, wherein the cover has a Shore D hardness of about 65 or less.

* * * * *